US000001962H

(19) United States

(12) Statutory Invention Registration (10) Reg. No.: US H1962 H

Peterson et al. (43) Published: Jun. 5, 2001

(54) FAST ACTING DOUBLE PUFF VALVE

(75) Inventors: Gus G. Peterson; Amnon Fisher, both of Alexandria, VA (US)

(73) Assignee: The United States of America as represented by the Secretary of the Navy, Washington, DC (US)

(21) Appl. No.: 08/709,954

(22) Filed: Sep. 9, 1996

(51) Int. Cl.[7] ..... F16K 11/24

(52) U.S. Cl. ..... 137/551; 137/595; 137/607

(58) Field of Search ..... 137/595, 607, 137/625.18, 625.4, 551

(56) References Cited

U.S. PATENT DOCUMENTS

| | | | | |
|---|---|---|---|---|
| 1,257,070 | * | 2/1918 | Discher | 137/625.18 |
| 2,181,156 | * | 11/1939 | Schmidt | 137/595 X |
| 3,361,045 | | 1/1968 | Oertel et al. | 95/53 |
| 3,760,225 | | 9/1973 | Ehlers et al. | 315/111 |
| 4,063,096 | | 12/1977 | Roberts | 250/343 |
| 4,223,698 | * | 9/1980 | Reinicke | 137/595 |
| 4,635,282 | | 1/1987 | Okada et al. | 378/34 |
| 4,707,983 | * | 11/1987 | Gillon | 137/595 |
| 4,771,447 | | 9/1988 | Saitoh et al. | 378/119 |

OTHER PUBLICATIONS

Kriesel et al.; Simple, Fast, Puff valve; Rev. Sci. Instrum. 62(10) pp. 2372–2374; Oct. 91.

Wong et al.; Balanced Puff valve for imploding gas–puff experiments; Rev. Sci, lastrum 7(8); pp. 1684–1686; Aug. 86.

Finken et al.; The Gas—Liner Pinch—A New Spectro Scopic Light Source; Phy. Ltrs. vol. 85S, No. 5; pp. 278–280; Oct. 81.

Fisher et al.; Fast Valve for Gas injection into Vacuum; Rev Sci Instrum. 49(b); pp. 872–873; Jun. 78.

* cited by examiner

*Primary Examiner*—Harold J. Tudor

(74) *Attorney, Agent, or Firm*—Barry A. Edelberg; Charles J. Stockstill

(57) ABSTRACT

The valve is designed for the ejection of a plurality of different gases from within the valve, simultaneously, by having a plurality of plenum chambers within the chamber of the valve, and a poppet therein, that are charged with gases under pressure. The gases are sealed within the respective plenum chambers by the action of a spring that urges the poppet against a gas exit port associated with each plenum chamber. Ejection of the gases is accomplished by the application of an electrical current into a coil surrounding the poppet which produces an electromagnetic field that causes a non-ferrous hammer to be driven away from the coil and strike the poppet. Upon being struck by the hammer, the poppet is driven off of the plurality of gas exit ports thereby allowing the gases to be ejected, simultaneously, from the respective plenum chambers into a region of lower pressure.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FAST ACTING DOUBLE PUFF VALVE

BACKGROUND OF THE INVENTION

1. Field of the Invention

This invention pertains generally to a valve and more particularly to a fast valve capable of ejecting a plurality of gases, simultaneously.

2. Description of the Related Art

In operations, such as the production of a dense plasma, gas is injected into a chamber. In this type of operation, as well as many others, there is a need for a valve to deliver a puff of gas within a short period. A delay between the valve opening the operation may cause the operation to be unsuccessful.

Currently, a typical valve for use in plasma production operates through the use of diamagnetic repulsion, has only one gas chamber and, therefore, operates with only one gas or gas mixture at a time. This type of valve 10 is shown in FIG. 1 and operates by discharging a capacitor (not shown) into a coil 12 thereby creating a magnetic field that repels an aluminum ring 14 which rests above the coil 12. The ring 14 is allowed to accelerate through a predetermined distance, thereby achieving a large velocity before striking a nylon poppet 16. The poppet 16 is then driven off an O-ring 17, opening the valve 10 and permitting a gas to flow through the gas inlet 18 and out the gas outlet 19. Use of this two stage process of valve opening reduces the rise time when compared with designs using magnetic forces to open the valve directly. Compare, Simple, fast, puff valve, Rev. Sci. Instrum. 62 (10), pp. 2372–2374, Oct. 91; U.S. Pat. No. 4,771,447, Saitoh et al., 1988; Kriesel et al., and Wong et al., Balanced puff valve for imploding gas-puff experiments, Rev. Sci. Instrum, 57(8), pp. 1684–1686, Aug. 86. Some experiments require the use of two gases, therefore, two, separate, independently working fast valves are required to provide concentric gas streams. See, Finken et al., *The Gas-Liner Pinch—A New Spectroscopic Light Source*, Phy. Ltrs. Vol. 85A, No. 5, pp. 278–280, Oct. 81. However, the use of two valves creates problems with gas rise times which is dependent upon the length that a gas has to travel downstream of the valve. In a two-valve system, one valve has to be displaced farther back or to the side of the other and this requires long flow tubes which in turn causes the gas rise time to be longer. A longer gas rise time allows the gas to diffuse with the other gas or into the chamber and cause electrical breakdown.

SUMMARY OF THE INVENTION

The object of this invention is to provide a valve capable of ejecting a plurality of gases, simultaneously, into an a chamber.

This and other objectives are accomplished by the use of a valve having a plurality of plenum chambers for the storage of several gases under pressure. A poppet within the valve is displaced by an electromagnetic force thereby allowing the plurality of gases to be ejected, simultaneously, from the plenum chambers into a region of lower pressure.

DESCRIPTION OF THE PREFERRED EMBODIMENT

For the purpose of simplification, the valve described below is one that is used for the injection of two gases into a region of lower pressure, this type of valve is commonly referred to as a puff valve. However, the invention may be used for other applications and additional gases may be accomodated without detracting from the scope or spirit of the invention as described in the claims.

Figure 1:
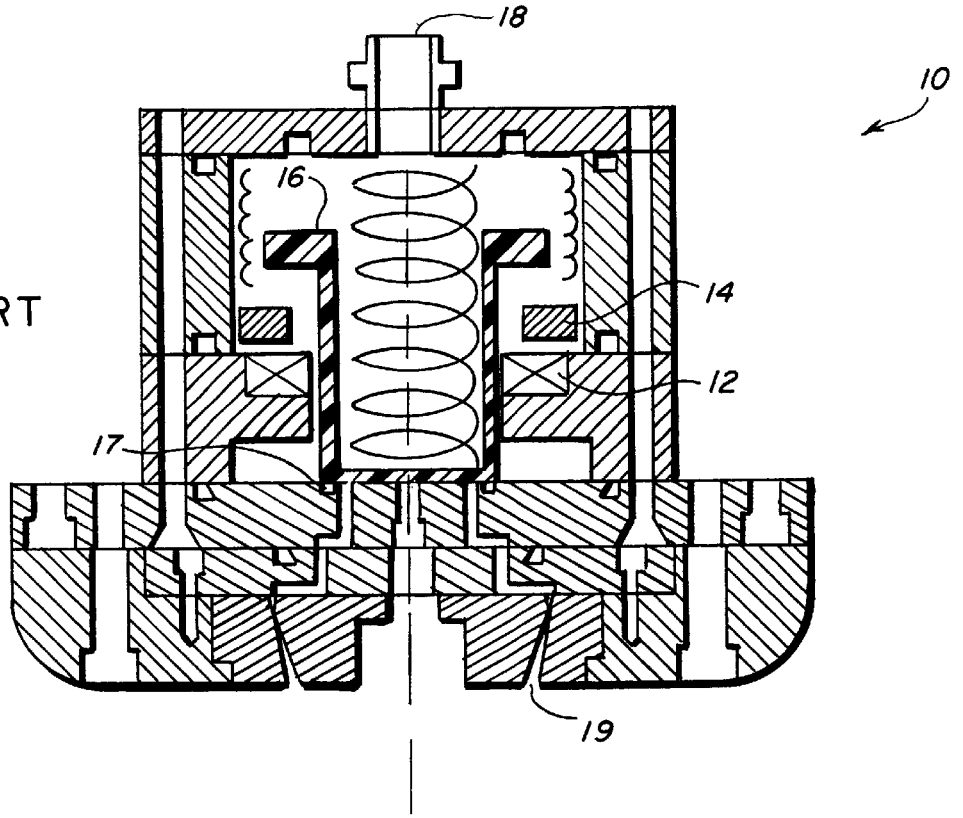
PRIOR ART FIG. 1
FIG. 1 shows the prior art of a valve for use with a single gas.
Figure 2A:
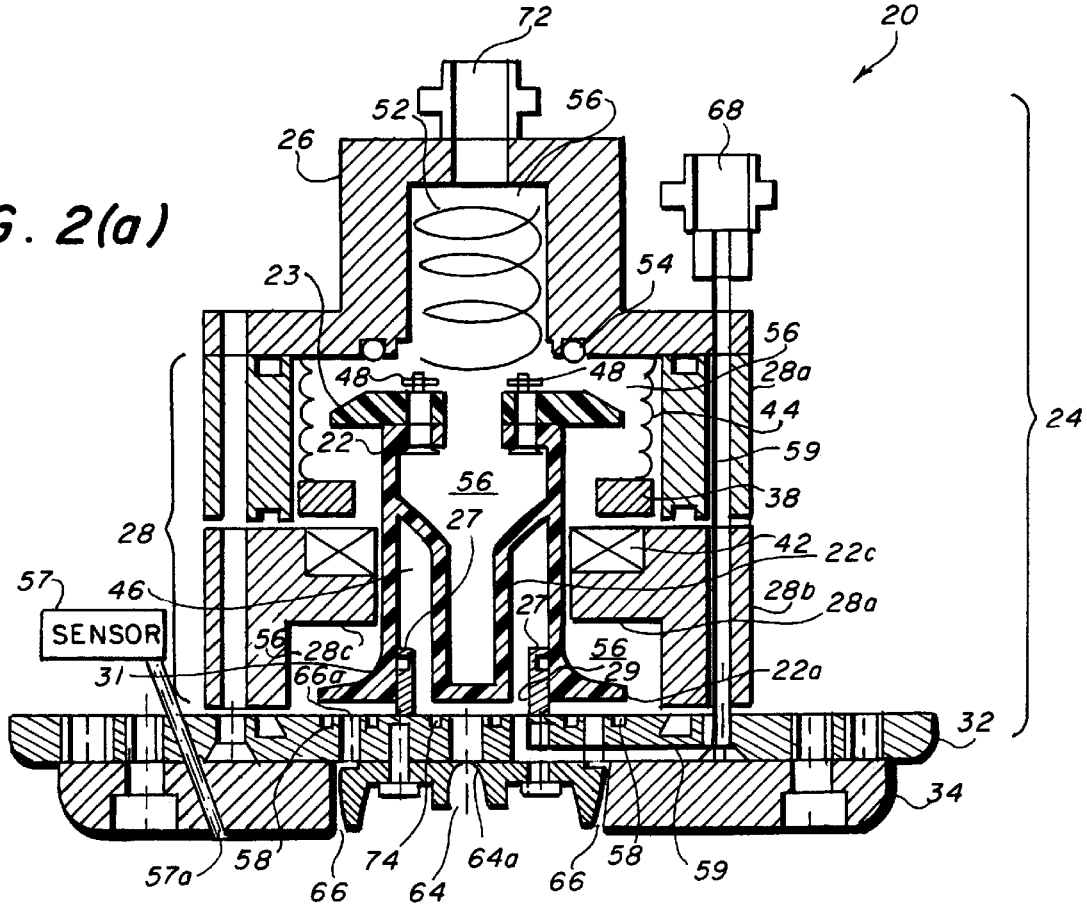
FIG. 2*a* shows a valve capable of ejecting a plurality of gases.
Figure 2B:
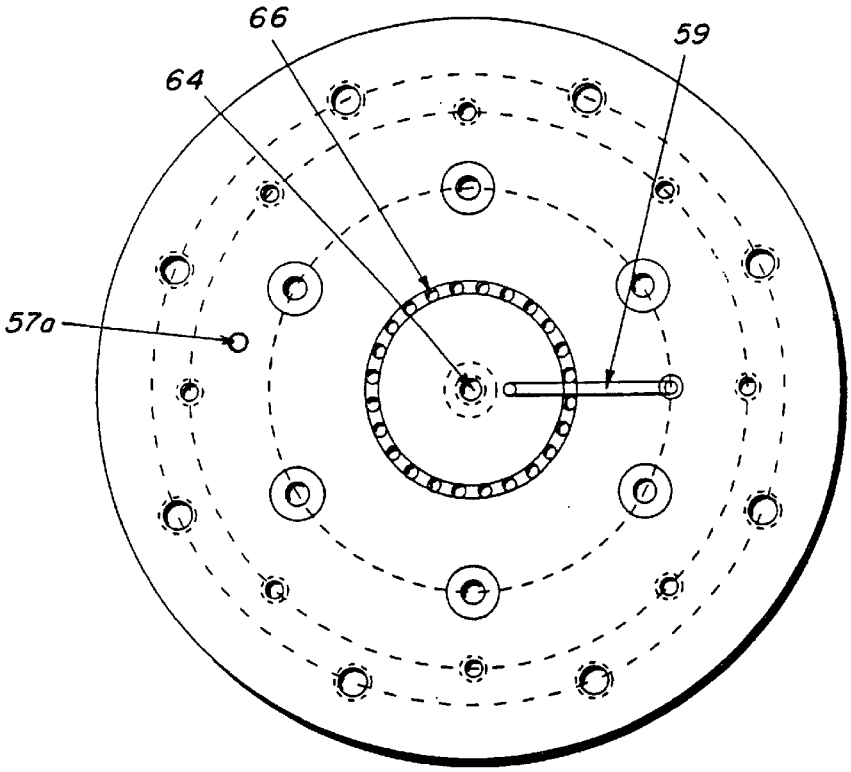
FIG. 2*b* shows a bottom view of the valve shown in FIG. 2*a*.

The valve 20, as shown in FIG. 2*a,* is comprised of a valve housing 24; a poppet 22, contained within the valve housing 24; a metallic valve base 32, and a metallic nozzle section 34. The valve housing 24 is further comprised of two sections having cavities within—an upper housing 26 made of a metal such as stainless steel or aluminum, and a poppet section 28 made of a non-metallic material such as fiberglass epoxy. The poppet section 28 is further divided into an upper and lower portion 28*a* and 28*b,* respectively, having a tubular cylindrical shape. Within the upper and lower portions 28*a* and 28*b* of the poppet section 28 is located the poppet 22. To the lower portion 28*b* of the poppet section 28 is attached a metallic base plate 32 containing inlets and outlets for directing the flow of gases. A metallic nozzle section 34 attached to the metallic base plate 32 to complete the valve 20 structure. The nozzle section 34 contains a plurality of supersonic nozzles 64 configured in an annular pattern, as shown in FIG. 2*b,* and a single nozzle 66, to direct and accelerate the discharge of the gases into a test chamber, such as a vacuum chamber (not shown), is (Although the valve base 32 and nozzle section 34 are metal in the preferred embodiment, they may be made of any suitable material, metallic or non-metallic.) The cavity within the upper housing 26 and poppet housing 28 forms a first plenum chamber 56 for the storage of a first gas.

The upper portion 28*a* of the poppet section 28 is tubular, without any protrusions. The lower portion 28b of the poppet section 28 is also tubular but has a circular protrusion, or shoulder, 28*c* located within the cavity. Positioned on the upper portion of the shoulder 28*c* is a ring-type magnetic coil 42. The magnetic coil 42 is a ribbon wound coil having fiberglass material between the windings, a type well known to those skilled in the art. The poppet 22 is disposed inside of the circular shoulder 28*c* and extends from the lower portion 28*b* into the upper portion 28*a* of the poppet section 28.

The poppet 22 is machined from a solid block of nylon, or a similar non-conducting material, has a skirt 22*a* extending outward from its lower portion extending into the first plenum chamber 56, this skirt 22*a* provides a gas seal and acts to control for the discharge of the gas within the first plenum chamber 56. The material on the lower portion of the interior of the poppet 22 is removed so as to form a second plenum chamber 46 for the storage of a second gas. Within the second plenum chamber 56, a plunger 22*c* extends through the center to a point parallel to the to the face of the shirt 22*a*. The plunger 22*c* provides the gas seal and acts to control the discharge of the gas from the second plenum chamber 46. Flow of gases between the first and second plenum chambers 56 and 46, respectfully, is prevented by the use of O-rings 27 between the poppet 22 and a circular ring 29 extending up into the second plenum chamber 46 from base plate 34. By utilizing the poppet 22 to control the discharge of the gases from both the first and second plenum chambers 56 and 46, respectively, simultaneous discharge of the gases is achieved. (The selection of fiberglass, or any other suitable non-conducting material for the poppet section 28 and poppet 22 is essential so as not to induce an interference with the operation of the magnetic coil 42.)

The part of the poppet 22, extending into within the upper portion 28*a* of the poppet section 28 has a circular nylon shoulder, or striking pad, 23 attached to the top of the poppet 22 by machine screws 48, preferably aluminum. (However, any type screw made of a similar light and strong material may be utilized.) This striking pad 23 provides a striking surface for a circular ring, or hammer, 38, which is disposed atop the magnetic coil 42 in the inactivated or rest position. The hammer 38 is of approximately the same size and shape as the magnetic coil 42 and is made of a non-ferrous metal such as aluminum.

In the rest position, the hammer 38 is urged against the magnetic coil 42 by the hammer return spring 44. The hammer return spring is of a type well known to those practicing the art and must only be of sufficient strength to return the poppet to the rest position after activation, in this embodiment a one ounce spring was found to be adequate. It is noted that if the hammer 38 were made of a ferrite metal would nullify the effectiveness of the magnetic coil 42, so it is essential that the hammer 38 be made of a non-ferrous metal.

The poppet 22, in the rest position, is urged against the metallic valve base 32 by a poppet return spring 52 extending out of the upper valve section 26 onto the collar 23 of the poppet 22. This urges the shoulder 22*a* of the poppet 22 against an O-ring 58 around a gas exhaust port 66*a* for the gas contained within the first plenum chamber 56 thereby preventing the gas resident within the first plenum chamber 56 from escaping Also, the plunger 22*c* is urged against an O-ring 74 around the gas exhaust port 64*a* in the valve base 32 sealing off the exit port 64*a* for a gas contained within the second plenum chamber 46.

Prior to conducting any experiment, the first and second plenum chambers 56 and 46, respectively, are filled with a gas or plurality of gases, such as argon or hydrogen. In this embodiment, the first gas provided the first plenum chamber 56 is applied through a gas port 72 located at the top of the upper valve housing 26 and the second gas is provided to the second plenum chamber through gas inlet 68 through a passage 59. In designs having more than two plenum chambers each plenum chamber would have its respective gas inlet and outlet.

Activation of the valve 20 accomplished by application of an electrical current to the magnetic coil 42. Upon application of the electrical current, the resulting electromagnetic field from the magnetic coil 42 causes eddy currents to form in the hammer 38, thereby creating a repulsive force causing the hammer 38 to be driven away from the magnetic coil 42 and strike the nylon shoulder 23 of the poppet 22. When struck, the poppet 22 is driven away from its rest position, the poppet return spring 52 is compressed, and the poppet shoulder 23 is urged against an O-ring 54 in the upper valve housing 26 sealing off the first plenum chamber 56. The gases in the first and second plenum chambers 56 and 46, respectively, are allowed to flow through the exit nozzles 66 and 64, respectively, into the test chamber (not shown).

The poppet spring 52 is of a type well known to those practicing in the art and must only have sufficient force to return the poppet 22 to the its original position after activation, in this embodiment an eight ounce spring was found to be adequate. The O-rings described above are preferably butyl rubber, but any acceptable material may be utilized as long as it is compatible with the test gases and valve materials.

A sensor 57, biased at a predetermined voltage (in this instance 1000 volts), is located on the base plate 34 to indicate that gas has begun to flow from the plenum chambers, through port 57*a*. When the gas has been dispelled from the plenum chambers 56 and 46, the poppet 22 is returned to the rest position by the poppet spring 52, the valve 20 is ready to be recharged with the gases for another experiment. The recharging sequence and triggering of subsequent experiments may be controlled through the use of the sensor 57 and separate electronic control circuits (not shown).

Figure 3:
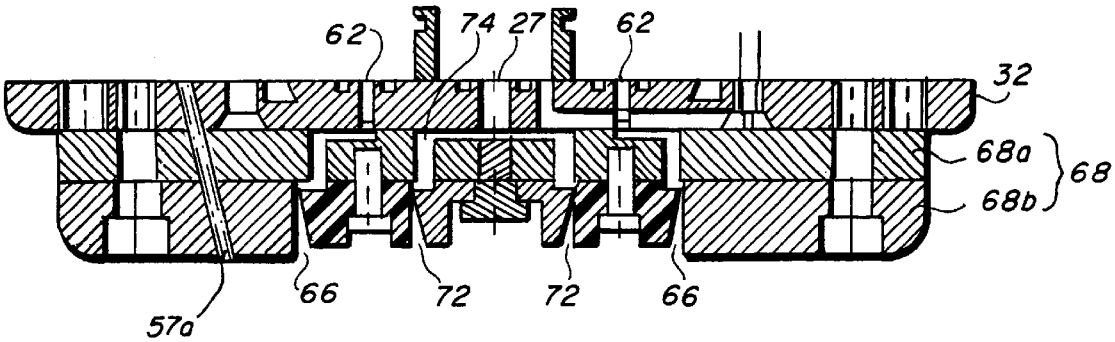
FIG. 3 shows an alternative base plate having annularly configured supersonic nozzles for both the first and second plenum chambers.

In a second preferred embodiment, as shown in FIG. 3, a nozzle plate 68 comprised of a manifold section 68*a* and a nozzle section 68*b* is attached to the base plate 32. This configuration differs from that previously described in that the exhaust nozzles 72 from the second plenum chamber 46 are annularly configured supersonic nozzles as are the annularly configured exhaust nozzles 67 for evacuating the gas from the first plenum chamber 56. This allows for a wider dispersion of the second gas into the vacuum chamber (not shown).

In both embodiments the design of the nozzle plates 34 and 68, the essential criteria for the exit nozzles 66 and 72 is symmetry. The number of nozzle openings is left to the discretion of the designer, the only requirement being that they are uniformly symmetrical.

Although the invention has been described in terms of the exemplary preferred embodiments thereof, it will be understood by those skilled in the art that still other variations and modifications can be affected in this preferred embodiment without detracting from the scope or spirit of the invention. Such as, the valve 20 is shown in the upright position, in actual operation the position of the valve is immaterial. Also the designer may develop configurations having more plenum chambers than the two illustrated in the preferred embodiment. Also, forming the poppet 22 in two sections in this embodiment is merely to facilitate the assembly of the valve 20, if the valve 20 can be designed so as to not require a two-piece poppet section 28 for assembly, a one-piece design may be substituted.

What is claimed is:

1. A valve comprised of:

a valve housing having one or more plenum chambers;

a poppet positioned within said housing having one or more plenum chambers;

a gas within each plenum chamber of the valve housing and poppet under a predetermined pressure;

a plurality of gas exit ports, each port associated with an individual plenum chamber, the poppet being positioned over the ports so as to prevent the flow of gases from the plenum chambers when the valve is in a rest position;

means for generating an electrical current;

an electrical coil surrounding the poppet which, when activated by the electrical current, generates an electromagnetic field; and a hammer surrounding the poppet, and resting on said coil, said hammer being repelled from the coil by the electromagnetic field displacing the poppet, thereby opening the gas exit ports and allowing the gases to be ejected from each plenum chamber, simultaneously and unmixed.

2. A valve comprised of:

a valve housing having one or more plenum chambers for storing one or more gases under predetermined pressures;

a poppet positioned within said housing having one or more plenum chambers for storing one or more gases under a predetermined pressure;

a plurality of gas exit ports, each port associated with an individual plenum chamber, the poppet being positioned over the ports so as to prevent the flow of gases from the plenum chambers when the valve is in a rest position;

an electrical coil for generating an electromagnetic field surrounding said poppet;

a non-ferrous hammer resting on the coil which, when the electromagnetic field is activated, is repelled from the coil thereby displacing the poppet, opening the gas exit ports, and allowing the gases to be ejected from the plenum chambers, simultaneously, into a region of lower pressure; and means for detecting when the gases are ejected from the plenum chambers.

* * * * *